United States Patent
Lachance et al.

(10) Patent No.: US 6,907,164 B2
(45) Date of Patent: Jun. 14, 2005

(54) ADJUSTABLE ATHERMAL PACKAGE FOR OPTICAL FIBER DEVICES

(75) Inventors: Richard L. Lachance, Ste-Foy (CA); André Vo Van, Ste-Foy (CA); Michel Morin, Sillery (CA); Martin Guy, Cap-Rouge (CA); Martin Pelletier, St-Jean Chrysostome (CA)

(73) Assignee: Teraxion, Inc. (CA)

( * ) Notice: Subject to any disclaimer, the term of this patent is extended or adjusted under 35 U.S.C. 154(b) by 0 days.

(21) Appl. No.: 09/952,715

(22) Filed: Sep. 12, 2001

(65) Prior Publication Data

US 2002/0141700 A1 Oct. 3, 2002

Related U.S. Application Data

(60) Provisional application No. 60/270,196, filed on Feb. 22, 2001.

(51) Int. Cl.[7] ................................................. G02B 6/34
(52) U.S. Cl. .............................. 385/37; 385/31; 385/15; 385/137
(58) Field of Search .............................. 385/37, 31, 15, 385/10, 137, 99

(56) References Cited

U.S. PATENT DOCUMENTS

| | | | |
|---|---|---|---|
| 4,936,646 A | 6/1990 | Enochs et al. ............. | 350/96.2 |
| 5,042,898 A | 8/1991 | Morey et al. ............... | 385/37 |
| 5,694,503 A | 12/1997 | Fleming et al. ............. | 385/37 |
| 5,914,972 A * | 6/1999 | Siala et al. ................ | 372/33 |
| 5,991,483 A * | 11/1999 | Engelberth ................. | 385/37 |
| 6,044,189 A | 3/2000 | Miller ...................... | 385/37 |
| 6,087,280 A | 7/2000 | Beall et al. ................ | 501/7 |
| 6,101,301 A | 8/2000 | Engelberth et al. .......... | 385/37 |
| 6,374,015 B1 * | 4/2002 | Lin .......................... | 385/37 |
| 6,449,402 B1 * | 9/2002 | Bettman et al. ............. | 385/15 |

FOREIGN PATENT DOCUMENTS

WO  WO9859267  12/1998  ............ G02B/5/18

OTHER PUBLICATIONS

G.W.Yoffe, P.A. Krug, F. Ouellette, and D. Thorncraft, "Temperature–compensated optical–fiber Bragg gratings", OFC, vol. 8, 1995 OSA Technical Digest Series, Paper W14, p. 134.

G.W.Yoffe, P.A. Krug, F. Ouellette and D.A. Thorncraft, "Passive temperature–compensating package for optical fiber gratings", Appl. Optics, vol. 34, No. 30, Oct. 1995, pp. 6859–6861.

T.E. Hammon, J. Bulman, F. Ouellette & S.B.Poole, "A temperature compensated optical fiber Bragg grating band rejection filter and wavelength reference", OECC'98 Technical Digest, pp. 350–351, 1996.

(Continued)

Primary Examiner—Fayez G. Assaf
(74) Attorney, Agent, or Firm—Altera Law Group, LLC

(57) ABSTRACT

An athermally packaged optical fiber device, such as a Bragg grating, is provided. The device includes a hollow structure, and a free and a threaded member projecting in the hollow structure from both ends. The optical fiber is mounted in tension inside the hollow structure through longitudinal fiber-receiving bores in both members, and has an anchor point affixed to each member with the grating therebetween. The anchor point of the threaded member is provided outside of the hollow structure, making the device more compact. The free and threaded members are rotatable together to adjust the resonant wavelength of the grating, and a nut may be provided to allow a fine-tuning. The hollow structure, free member and threaded member have a coefficient of thermal expansion selected so that they together compensate for the temperature dependency of the Bragg wavelength.

14 Claims, 2 Drawing Sheets

OTHER PUBLICATIONS

D.L. Weidman, G.H. Beall, K.C. Chyung, G.L. FranciS, R.A. Modavis, and R.M. Morena, "A novel negative expansion substrate material for athermalizing fiber Bragg gratings", 22$^{nd}$ European Conference on Optical Communication—ECOC'96, Oslo, Paper MoB 3.5 pp. 1–61. . . 63.

A.Inoue, T. Iwashima, T. Enomoto, S. Ishikawa and H. Kanamori, "Optimization of fiber Bragg grating for dense WDM transmission system", IEICE Trans. Electron. vol. E81–C, No. 8, pp 1209–1218, Aug. 1998.

D. Weidman, "Fiber Bragg gratings enhance real–world applications", Laser Focus World, pp. 99–103; Mar. 1999.

T. Iwashima, A. inoue, M. Shigematsu, M. Nishimura, Y. Hattori, "Temperature compensation technique for fiber Bragg gratings using liquids crystalline polymer tubes", Electronics Letters, vol. 33, No. 5, pp. 417–419, Feb. 27, 1997.

S. Magne, S. Rougeault, M. Vilela, and P. Ferdinand, "State–of–strain evaluation with fiber Bragg grating rosettes:application to discrimination between strain and temperature effects in fiber sensors", App . . . Optics, Dec. 1997, vol. 36, No. 36, pp. 9437–9447.

V. Arya, D.W. Sherrer, A. Wang, R.O. Claus, and Mark Jones, "Application of Thin–Film Optical Filters to the Temperature Compensation of Optical Fiber Grating–Based Devices" IEEE Trans on Instrum. and Meas. vol. 46, No. 5, Oct. 1997, pp. 1173–1177.

* cited by examiner

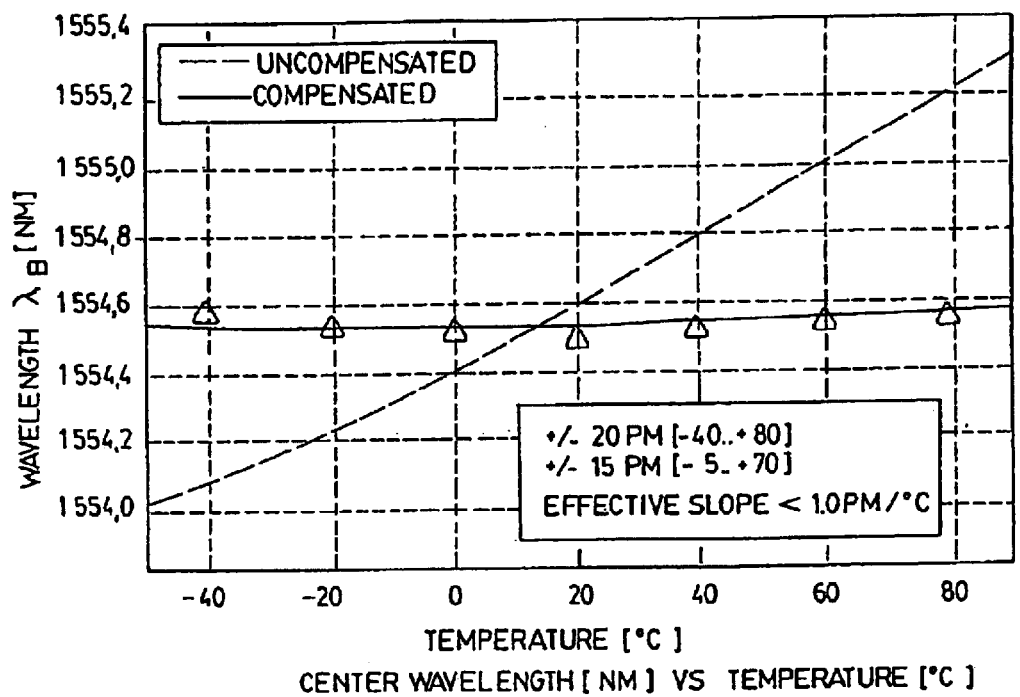
FIG. 1 VARIATION OF THE RESONANT WAVELENGTH WITH TEMPERATURE FOR COMPENSATED AND UNCOMPENSATED GRATINGS.
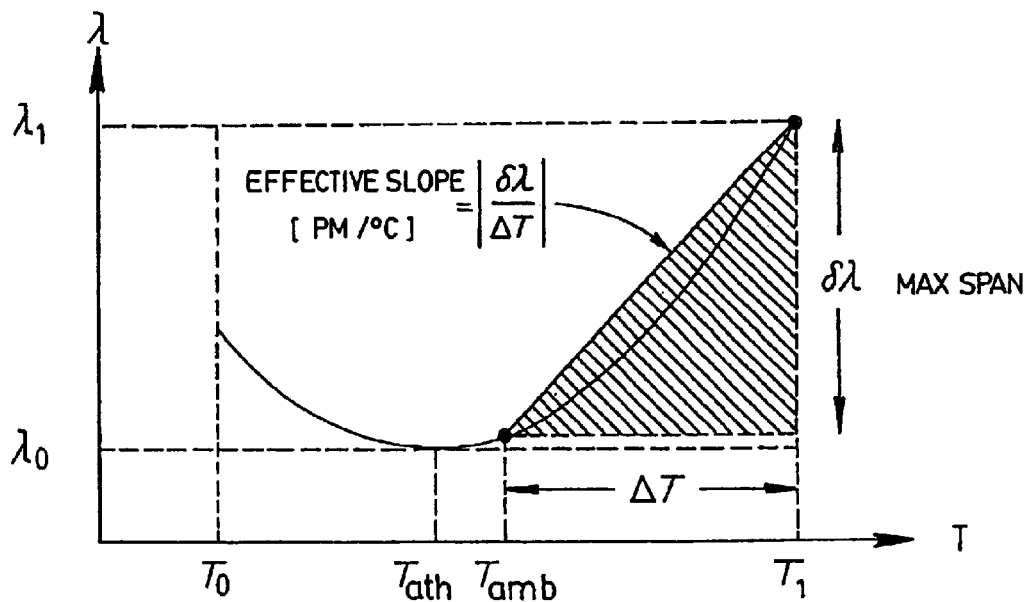
FIG. 2 PARAMETERS USED TO CHARACTERIZE THE ATHERMAL CURVE

ADJUSTABLE ATHERMAL PACKAGE FOR OPTICAL FIBER DEVICES

This application claims the benefit of Provisional Application No. 60/270,196, filed Feb. 22, 2001.

FIELD OF THE INVENTION

The present invention relates to optical fiber components and more particularly concerns an athermal package for Bragg gratings, compensating for temperature variations of the wavelength of the characteristic spectral response of such gratings, and to a fine-tuning mechanism for this wavelength.

BACKGROUND OF THE INVENTION

Optical-fiber Bragg gratings (FBGs) have become essential components in the telecommunications industry, where they perform various spectral filtering operations. A fiber Bragg grating consists of a periodic modulation of the index of refraction along the core of an optical fiber. It is created by exposing a photosensitive fiber to a properly shaped intensity pattern of ultraviolet light. This light produces a permanent change in the index of refraction in selected sections of the optical fiber. The resulting optical fiber grating behaves as a wavelength-selective reflector having a characteristic spectral response. In the case of a WDM filter, the reflected wavelength of light is often referred to as the grating wavelength or as the Bragg wavelength of the grating. Their stability and reliability, in conjunction with their all-guided-wave nature, have made FBGs ideal candidates for fiber optic system applications. They now play an important role in numerous optical fiber devices for guided-wave optics and fiberoptic-system applications.

Fiber Bragg gratings are now used extensively in the field of optical telecommunications, e.g. for wavelength division multiplexing (WDM), for compensating chromatic dispersion in optical fibers, for stabilizing and flattening the gain of optical amplifiers, for stabilizing the frequency of semiconductor lasers, and more generally in various filters. They are also found in instrumentation, e.g. as narrowband wavelength-selective reflectors for fiber lasers, or as sensors for the measurement of strain, temperature, and hydrostatic pressure.

The Bragg wavelength depends on the period of modulation and on the average value of the refractive index in the fiber. Both quantities vary nearly linearly with the ambient temperature and the stress applied to the fiber. This, in turn, translates into a nearly linear variation of the Bragg wavelength with temperature and stress. For example, the Bragg wavelength of a typical FBG increases with temperature at a rate of about 10 pm/° C. at 1550 nm. As a result, fiber Bragg gratings are well suited for use as strain or temperature sensors. The thermal dependence represents, on the other hand, a major disadvantage for applications requiring a good stability of the spectral response of the FBG. It prevents the use of FBGs as frequency standards in advanced communication networks and in commercial systems, which typically have to operate over an extensive range of temperature.

In DWDM (Dense Wavelength Division Multiplexing) systems, for example, optical filters for adding/dropping optical signal channels must have high wavelength accuracy and high stability against changes in environmental conditions. For an allocation in their spectral domain with a spacing as narrow as 0.4 nm, the thermal variability of FBGs restrains the operational range to a few degrees, which is clearly too restrictive. Gain flattening filters (GFFs) and dispersion compensators using chirped FBGs must also have a stable spectral response to maintain their performance. For the accurate and reliable long-term operation of these devices, suitable temperature compensation techniques are a necessity.

Different temperature stabilization techniques have been proposed in the past, and there are already many known various types of packages for holding Bragg gratings constructed in such a way as to render their wavelength insensitive to temperature changes. A good survey of temperature-compensation techniques for fiber Bragg gratings is presented in S. Magne, S. Rougeault, M. Vilela, and P. Ferdinand, "State-of-strain evaluation with fiber Bragg grating rosettes: application to discrimination between strain and temperature effects in fiber sensors", Appl. Optics, December 1997, Vol. 36, No. 36, pp. 9437–9442. They can be classified according to whether they are intrinsic i.e., make use of the fiber properties themselves, or extrinsic i.e., require an extra material. Intrinsic methods generally rely on a second grating being used in parallel for calibration purposes. These methods have been devised mostly for sensing applications, in order to compensate for the thermal sensitivity of FBG sensors used to measure physical parameters such as strain, other than temperature. For example, the resonance wavelength of a FBG sensor glued to a piece of metal to measure its expansion (or contraction) will react to the strain resulting from the thermal expansion (or contraction) of the metal, but also to the change in temperature causing this expansion (or contraction) in the first place. In order to distinguish between the two effects, a second FBG located in the vicinity of the first one but not glued to the piece of metal, is used to measure the change in temperature only. A correction to the response of the first FBG is then carried out post measurement in order to determine the expansion (or contraction) of the metal. Such calibration methods are unsuitable for telecommunications applications, where the spectral response of each individual FBG must be stabilized against temperature fluctuations, a task carried out however by extrinsic systems.

A first class of extrinsic systems relies on the active stabilization of the FBG spectral response. Certain parameters are then continuously monitored and dynamically controlled with a feedback loop. For example, active temperature control of the grating environment is typically accomplished by a stabilization system that holds the temperature at a level above the maximum ambient temperature to which the device is expected to be exposed. The temperature control can be carried out with devices such as Peltier elements. In other systems, the Bragg wavelength is monitored continuously and corrected by straining the fiber with piezoelectric elements. While being an effective approach, active thermal stabilization is costly to implement, its complexity leads to reliability concerns, and the power consumption of control circuits represents a major handicap. In general, preference is given to so-called passive devices, since they are much simpler and require no power source.

Passive temperature compensation devices generally operate by controlling the elongation with temperature of the optical fiber containing the FBG. This is usually accomplished by clamping the fiber containing the FBG to a mechanical structure that imposes a negative elongation to the fiber as the temperature increases. This contraction of the fiber compensates for the increase in its index of refraction with temperature, thus allowing a stabilization of its Bragg wavelength against temperature fluctuations.

Conceptually, the simplest method to achieve this thermal compensation is by attaching the fiber containing the FBG to a material having the desired intrinsic negative coefficient of thermal expansion The support material therefore tends to stabilize the Bragg wavelength around its initial value. Examples of such devices using certain glass-ceramics as the support material are for example described in D. L. Weidman, G. H. Beall, K. C. Chyung, G. L. Francis, R. A. Modavis, and R. M. Morena, "A novel negative expansion substrate material for athermalizing fiber Bragg gratings", 22nd European Conference on Optical Communication—ECOC'96, Oslo, Paper MoB 3.5, pp. 1–61 . . . 63, D. Weidman, "Fiber Bragg gratings enhance real-world applications", Laser Focus World, pp. 99–103, March 1999, U.S. Pat. No. 5,694,503 (FLEMING et al) and in U.S. Pat. No. 6,087,280 (BEALL et al).

Devices using a material with an intrinsic negative coefficient of thermal expansion suffer from major drawbacks. The coefficient of thermal expansion (CTE) must be accurately matched to the optical fiber properties, a requirement that can be met only through a careful control of the material formulation. It must also be constant from one sample of the material to another, which is difficult to achieve in practice. Such materials are difficult to machine without spoiling their properties, and in particular without altering their coefficients of thermal expansion. Also, problems may occur with the supply of these esoteric materials (like β-eucryptite glass-ceramics substrate).

Such passive temperature compensation can also be achieved through the principle of differential expansion. The fiber containing the FBG is then clamped to a structure made of materials having different, but usually positive, coefficients of thermal expansion. The structure is arranged such that the different rates of expansion between the structural elements supporting the fiber result in a negative elongation of the fiber with increasing temperature. Typically, the fiber is stretched at low temperatures and allowed to relax as the temperature increases.

Many devices that employ materials with dissimilar positive thermal expansions to achieve the required negative expansion are known. Examples of typical prior art of passive temperature-compensating packages include U.S. Pat. No. 4,936,646 (ENOCH et al), disclosing relatively temperature insensitive fiber Bragg gratings. This is one of the earliest references describing the invention of an athermal package for optical fibers. U.S. Pat. No. 5,042,898 (MOREY et al) discloses a similar idea, associating aluminium as the material having the greater coefficient of expansion with Invar, silica, stainless steel, or iron as the material having the smaller coefficient of expansion. G. W. Yoffe et al. in G. W. Yoffe, P. A. Krug, F. Ouellette, and D. Thorncraft, "Temperature-compensated optical-fiber Bragg gratings", Optical Fiber Comm. Conf., Vol. 8, 1995 OSA Technical Digest Series, Paper W14, p. 134 and G. W. Yoffe, P. A. Krug, F. Ouellette, and D. A. Thorncraft, "Passive temperature-compensating package for optical fiber gratings", Appl. Optics, Vol. 34, No. 30, October 1995, pp. 6859–6861 disclose one of the first practical devices for packaging Bragg gratings. These papers also describe an active adjustment to set the strain of the fiber to the desired initial value. T. E. Hammon, J. Bulman, F. Ouellette, and S. B. Poole, "A temperature compensated optical fiber Bragg grating band rejection filter and wavelength reference", OECC '98 Technical Digest, pp. 350–351, 1996 similarly present packaging structures utilizing a combination of two materials having different thermal expansion coefficients.

A variation of the differential expansion method exists in the form of mechanical bending deformation compensation systems, such as disclosed in U.S. Pat. No. 6,044,189 (MILLER).

OBJECTS AND SUMMARY OF THE INVENTION

It is an object of the present invention to offer an improved athermal packaging for optical fiber Bragg gratings.

It is another object of the present invention to provide such a packaging where the Bragg wavelength is easily adjustable.

It is a preferable object of the invention to provide a fine-tuning mechanism for this Bragg wavelength.

Accordingly, the present invention provides an adjustable athermally packaged optical fiber device. The device includes an elongated hollow structure, having a longitudinal axis and first and second extremities, and a free and a threaded member respectively projecting inwardly of this hollow structure from its first and second extremities. The free and threaded members each have a fiber-receiving bore therein extending along the longitudinal axis. The free member is rotatable around this longitudinal axis with respect to the hollow structure, and the threaded member is threadedly engaged with the hollow structure along the longitudinal axis.

An optical fiber is mounted under tension in the hollow structure through the fiber-receiving bores of the free and threaded members. A first point of the fiber is affixed to the free member, and a second point is affixed to the threaded member at an end thereof extending outside of the hollow structure. The optical fiber has a refractive index grating extending between the first and second points, the grating having a characteristic spectral response. The hollow structure, free member and threaded member each have a coefficient of thermal expansion selected so that they together compensate for a temperature dependency of the characteristic spectral response of the grating.

Rotating means are also provided for jointly rotating the free and threaded members with respect to the hollow structure, to adjust a wavelength position of the characteristic spectral response of the grating.

According to another aspect of the invention, there is provided a fine-tunable athermally packaged optical fiber device. The device includes an elongated hollow structure having a longitudinal axis and first and second extremities. The device also includes a free and a threaded member, respectively projecting inwardly of the hollow structure from the first and second extremities thereof, and each having a fiber-receiving bore therein extending along the longitudinal axis. The free member is rotatable around the longitudinal axis with respect to the hollow structure. The threaded member is threadedly engaged with the hollow structure along the longitudinal axis.

An optical fiber is provided and mounted under tension in the hollow structure through the fiber-receiving bores of the free and threaded members, a first point of this fiber being affixed to the free member, and a second point to the threaded member. The optical fiber has a refractive index grating extending between its first and second points and having a characteristic spectral response. The hollow structure, free member and threaded member each have a coefficient of thermal expansion. These coefficients are selected so that they together compensate for a temperature dependency of the characteristic spectral response of the grating.

Rotating means are also provided for jointly rotating the free and threaded members with respect to the hollow structure, to adjust a wavelength position of the characteristic spectral response of the grating. A nut cooperates with the threaded member for fine-tuning this wavelength position.

In accordance with yet another aspect of the present invention, there is provided an athermal package for an optical fiber device, the device including an optical fiber having a refractive index grating therein. The grating has a characteristic spectral response.

The package includes an elongated hollow structure for mounting the optical fiber in tension therein. The hollow structure has a longitudinal axis and first and second extremities. A free and a threaded member respectively project inwardly of this hollow structure from the first and second extremities. The free and threaded members each have a fiber-receiving bore therein extending along the longitudinal axis, for receiving the optical fiber therethrough. The free member is rotatable around the longitudinal axis with respect to the hollow structure, and the threaded member is threadedly engaged with the hollow structure along the longitudinal axis. A first anchor point is provided in the free member to affix the optical fiber thereto, and a second anchor point is provided in the threaded member at an end thereof extending outside of the hollow structure, to affix the optical fiber thereto, with the grating extending between said first and second anchor points. The hollow structure, free member and threaded member each have a coefficient of thermal expansion selected so that they together compensate for a temperature dependency of the characteristic spectral response of the grating.

The device also includes rotating means for jointly rotating the free and threaded members with respect to the hollow structure, to adjust a wavelength position of the characteristic spectral response of the grating.

The present invention also provides an athermal package for a fine-tunable optical fiber device, this device including an optical fiber having a refractive index grating therein. The grating has a characteristic spectral response.

The package includes an elongated hollow structure for mounting the optical fiber in tension therein. The hollow structure has a longitudinal axis and first and second extremities.

A free and a threaded member are also provided. They respectively project inwardly of the hollow structure, from the first and second extremities thereof. The free and threaded members each have a fiber-receiving bore therein extending along the longitudinal axis, for receiving the optical fiber therethrough. The free member is rotatable around the longitudinal axis with respect to the hollow structure, and the threaded member is threadedly engaged with the hollow structure along the longitudinal axis. First and second anchor points are respectively provided in the free and threaded members to affix the optical fiber thereto with the grating extending between these first and second anchor points. The hollow structure, free member and threaded member each have a coefficient of thermal expansion selected so that they together compensate for a temperature dependency of the characteristic spectral response.

The package also includes rotating means for jointly rotating the free and threaded members with respect to the hollow structure, to adjust a wavelength position of the characteristic spectral response of the grating. A nut is also provided and cooperates with the threaded member for fine-tuning this wavelength position.

Further features and advantages of the present invention will be better understood upon reading of a preferred embodiment thereof with reference to the appended drawings.

BRIEF DESCRIPTION OF THE DRAWINGS

FIG. 1 is a graph showing the variation of the resonant wavelength with temperature for both a compensated and uncompensated Bragg grating.

FIG. 2 is a graph defining the parameters used to characterize the athermal curve.

DESCRIPTION OF A PREFERRED EMBODIMENT OF THE INVENTION

Figure 3:
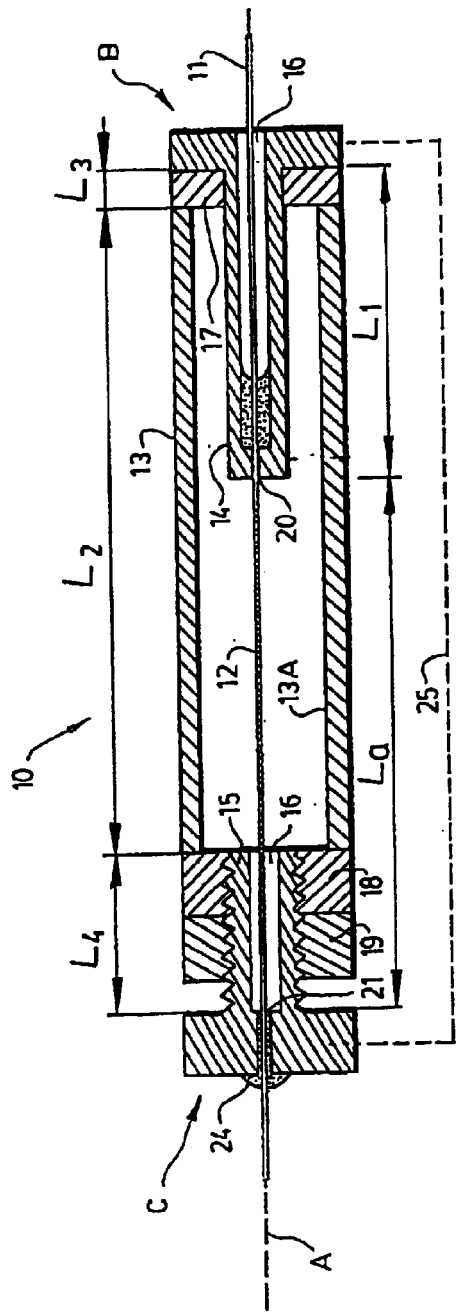
FIG. 3 is a cross-sectional side-elevation of an athermally packaged optical fiber device according to a preferred embodiment of the present invention.

The present invention relates to an athermal package for fiber Bragg gratings, which compensates for the temperature dependence of the Bragg wavelength of such gratings.

The device according to the preferred embodiment of the present invention is a passive temperature-compensating device based on the principle originally described in U.S. Pat. No. 5,042,898 (MOREY). It consists of an improved package for optical fiber gratings using simple and reliable mechanical elements. An optical fiber grating is mounted under tension in a multi-material package comprising a combination of compensating elements with different coefficients of thermal expansion. The expansion elements of this mechanical assembly contract or expand with temperature in such a way as to impart a desired amount of axial strain to the fiber grating in order to compensate for the thermal variation in the refractive index of the fiber and maintain the position of the characteristic spectral response of the grating substantially constant. When the temperature increases, the compensation components expand so that the distance between the mounting points to which the optical fiber is fixed decreases. This reduces the fiber length by just the amount necessary to automatically and passively cancel the shift in Bragg wavelength caused by the thermally induced increase in the refractive index of the optical fiber. Similarly, a decrease in the temperature of the device causes the compensation components to contract, thereby increasing the axial strain in the fiber grating to maintain the grating wavelength constant. The devised temperature-compensating package thus has a structure that permits the enclosed fiber grating length to contract upon heating, i.e., it has a net negative coefficient of thermal expansion.

To better understand the phenomena involved, we briefly discuss the theory of thermal expansion of Bragg gratings and the design procedure for a multi-material athermal package.

Theory of Thermal Expansion

A fiber Bragg grating consists of a periodic modulation of the index of refraction along the core of an optical fiber. This modulation can couple light between counter-propagating modes in a single mode optical fiber over a certain spectral domain. In other words, light of a proper wavelength is reflected when it encounters the refractive index modulation. In a uniform grating, the strongest reflection of light occurs at the Bragg wavelength $\lambda_B$ equal to twice the effective grating period:

$$\lambda_B = 2n\Lambda \qquad (1)$$

where $\Lambda$ is the spatial period of the index modulation in the fiber grating and n is the average effective refractive index of the guided mode at the position of the grating. Any environmental condition that affects either $\Lambda$ or n will thus also affect the Bragg wavelength. As it turns out, the refractive index in a typical single mode fiber increases with temperature, an effect known as the thermo-optic effect.

Likewise, the period of the index modulation Λ increases with temperature as a result of thermal expansion. These two effects combine to produce an increase of the Bragg wavelength with temperature, a situation described mathematically by the following equation:

$$\frac{\Delta \lambda_B}{\lambda_B} = \alpha_f \Delta T + \xi \Delta T \quad (2)$$

where $\alpha_f$ is the coefficient of thermal expansion of the fiber and ξ is the thermo-optic coefficient. The first term on the right hand side of the equation thus represents the change in the modulation period resulting from the thermal expansion, whereas the second one represents the effect of the change in the refractive index with temperature. Typical values for a silica fiber are $\alpha_f$=5×10$^{-7}$/° C. and ξ=7×10$^{-6}$/° C. The net temperature dependence of the Bragg wavelength for a grating written in a typical silica-based fiber is thus about +10 pm/° C. around the 1550 nm band and is primarily due to the change in n with temperature. FIG. 1 compares the typical thermal response of a non-packaged FBG to that of a compensated FBG as provided by the present invention.

The Bragg wavelength also increases when the fiber is stretched under the action of a tensile load, leading to an increase in the modulation period Λ. This increase is partially offset by an ensuing reduction in the refractive index n through the stress-optic (or photo-elastic) effect. This situation is described by the following equation:

$$\frac{\Delta \lambda_B}{\lambda_B} = \Delta \varepsilon - p_e \Delta \varepsilon \quad (3)$$

where $p_e$ is the photo-elastic constant and Δε=ΔL/L is the longitudinal strain in the fiber resulting from the applied tensile load, L being the fiber length. The first term on the right hand side of the equation represents the change in the modulation period resulting from the elongation of the fiber, whereas the second one represents the change in the average refractive index resulting from the photo-elastic effect. A typical value for the photo-elastic constant $p_e$ in a germanosilicate fiber is approximately 0.22, leading to a Bragg wavelength sensitivity of 1.2 pm/microstrain at 1550 nm.

Equations (2) and (3) describe the shift in the resonance wavelength of an unpackaged FBG resulting from a temperature variation or an applied load. This behavior is modified when the FBG is embedded into a package with its own thermal characteristics. In the proposed invention, the optical fiber containing the FBG is put under tension and fixed to two anchoring points on a multi-material structure. The length and modulation period Λ of the grating are then determined by the distance between these anchoring points, defined as $L_a$, as long as the fiber remains under tension. The structure is designed in such a way that the distance between the anchoring points decreases as the temperature goes up. In other words, the distance between these points is characterized by a negative coefficient of thermal expansion. On the other hand, the index of refraction increases with the temperature. This behavior is caused mainly by the thermo-optic effect, but also by a reduction in the stress-optic effect, since the tension in the fiber goes down as it expands thermally and as the anchoring points move closer to one another. The modulation period and refractive index thus display variations of opposite signs as the temperature fluctuates. Athermalization is achieved when these variations cancel out and the Bragg wavelength $\lambda_B$ remains constant as the temperature fluctuates.

Mathematically, the variation with temperature of the Bragg wavelength in such a packaged FBG is described by the following equation:

$$\frac{\Delta \lambda_B}{\lambda_B} = \alpha_a \Delta T + \xi \Delta T - p_e(\alpha_a - \alpha_f)\Delta T \quad (4)$$

where $\alpha_a$ is the coefficient of thermal expansion characterizing the thermal behavior of the distance between the anchoring points. The first term on the right hand side of the equation represents the effect of the change in length of the fiber, which directly translates into a proportional change in the modulation period Λ. The second term represents the influence of the thermo-optic effect on the index of refraction in the fiber. Finally, the last term represents the change in the stress-optic effect that impacts on the index of refraction in the fiber. Remembering that the coefficient of thermal expansion of the package $\alpha_a$ is negative, this last term shows that the reduction in the distance between the anchoring points and the thermal expansion of the fiber itself team up to reduce the tension in the fiber as the temperature goes up, hence contributing to the increase in the index of refraction.

It should be noted that the thermal expansion of the fiber no longer plays a role in the situation except through its impact on the stress-optic effect. This is so because the length of the grating is now determined by the distance $L_a$ between the anchoring points of the package. This is true as long as the fiber remains under tension. One must thus ensure that the initial strain in the fiber is sufficient to keep it under tension over the whole temperature range of operation. On the other hand, the level of applied tension (or strain) does not appear in Equation (4) and thus plays no part in establishing the temperature dependence of the Bragg wavelength other than ensuring that the fiber length is indeed controlled by the package. As a result, slight adjustments to the initial tension applied to the fiber can be used to fine-tune the absolute position of the characteristic spectral response of the grating.

Athermalization is achieved when the right hand side of Equation (4) vanishes, i.e. when:

$$\alpha_a = -\frac{p_e \alpha_f + \xi}{1 - p_e} \quad (5)$$

Should the thermal and optical parameters appearing in Equation (5) be constant, the athermalization could in principle be realized at all temperatures. Unfortunately, these parameters do vary with temperature, albeit slightly. As a consequence of these slight variations, the athermalization condition is achieved only at a given temperature $T_{ath}$, around which the Bragg wavelength displays a nearly parabolic variation with temperature.

Design Procedure

A package must be designed that meets the athermalization condition expressed by Equation (5). This can be achieved with a multi-material structure, such that the distance between the anchoring points at which the fiber grating is fixed is given by:

$$L_a = \sum_{i=1}^{N} c_i L_i \qquad (6)$$

where $c_i = +1$ or $-1$ depending on the geometry of the structure and $L_i$ is the length of the $i^{th}$ element of the package. Expression (6) is general in that it allows for the use of an arbitrary number N of different materials to build the athermalization structure. The coefficient of thermal expansion of the package is then given by:

$$\alpha_a = \frac{1}{L_a}\frac{dL_a}{dT} = \frac{\sum_{i=1}^{N} c_i \alpha_i L_i}{\sum_{i=1}^{N} c_i L_i} \qquad (7)$$

where $\alpha_i$ is the coefficient of thermal expansion of the $i^{th}$ material used in the athermalization structure. Let's consider for the time being a simple structure made up of only two different materials. The above expressions then reduce to:

$$L_a = L_1 - L_2 \qquad (8a)$$

and $$\alpha_a = \frac{\alpha_1 L_1 - \alpha_2 L_2}{L_1 - L_2} \qquad (8b)$$

These equations could describe, for example, a tube of length $L_1$ made of a low thermal expansion material that contains an insert of length $L_2$ made of a high thermal expansion material, one end of the fiber grating being fixed to the tube and the other one to the insert. As the temperature goes up, the insert expands towards the inside of the tube, thus producing a shortening of the optical fiber. The length $L_a$ must be larger than the length of the grating, whereas the coefficient of expansion must be negative as given by Equation (5) ($\alpha_1 L_1 < \alpha_2 L_2$). In order to reduce as much as possible the overall length of such a package, it is thus preferable to use materials with the largest possible difference in their coefficients of thermal expansion. Examples of suitable materials are silica for the low expansion material ($\alpha_{si} \approx 0.5 \times 10^{-6}/°$ C.) and aluminium for the high expansion material ($\alpha_{al} \approx 24 \times 10^{-6}/°$ C.).

As an example, a device according to the preferred embodiment described below with respect to FIGS. 3 and 4 was constructed following the above described design procedure. A silica-based single mode optical fiber with a conventional FBG 26-mm long was mounted in a package with an overall length of 55 mm and an outer diameter of 4.8 mm. The performance of the packaged grating was determined in a conventional manner. The results are shown in FIG. 1, where the plain curve refers to the packaged grating, whereas the dashed curve refers to an identical but unpackaged grating.

The parameters used to characterize the parabolic athermal curve are defined in FIG. 2. The athermal package exhibited a total variation in Bragg wavelength $\lambda_1 - \lambda_0 = 25$ pm over the range $-40°$ C. to $80°$ C., whereas the unpackaged FBG endured a shift larger than 1.1 nm. The effective slope of the device is defined as the ratio between the maximum wavelength span $\delta\lambda$ and the temperature range $\Delta T$ as shown in FIG. 2. It thus represents the average rate of variation of the Bragg wavelength between the design temperature of operation $T_{amb}$ and either one of temperatures $T_0$ or $T_1$ limiting the specified range of operation. The effective slope of the packaged grating was less than 0.5 pm/° C. compared to that of the unpackaged grating of +10 pm/° C. The improvement is therefore significant and evident.

Description of a Device According to the Preferred Embodiment

Figure 4:
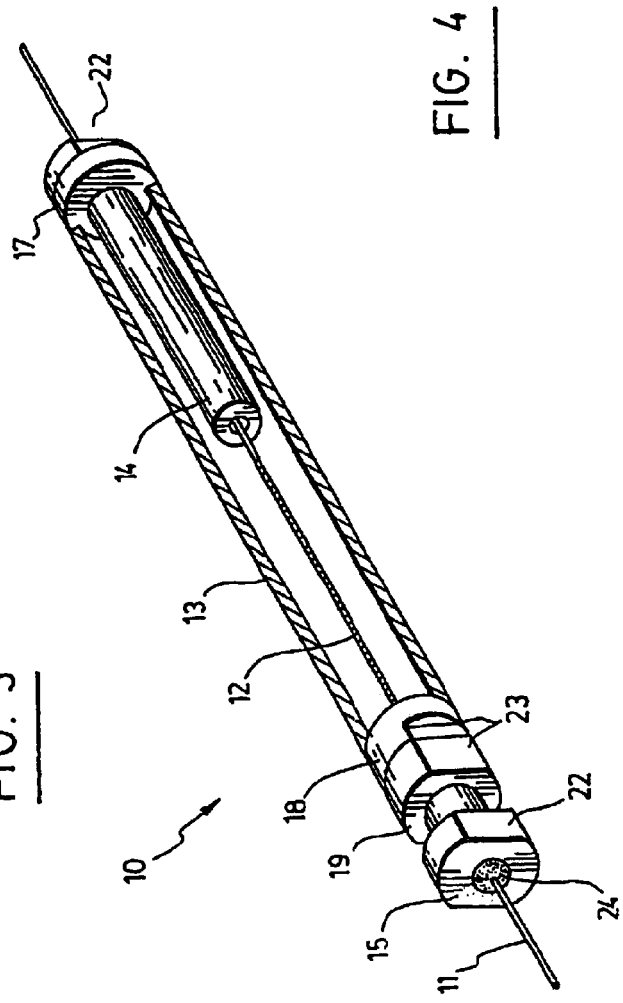
FIG. 4 is a perspective view of the device of FIG. 3.

With reference to FIGS. 3 and 4, there is shown an adjustable athermally packaged optical fiber device 10 in accordance with a preferred embodiment of the present invention.

The device 10 includes a refractive index grating 12 of length $L_a$ or smaller, which is an integral portion of optical fiber 11. An athermal package is provided to compensate for the temperature dependency of this grating 12. The package includes three main elements, that is, elongated hollow structure 13, free element 14 and threaded element 15. The elongated hollow structure 13 has a longitudinal axis A and first and second extremities B and C. The free and threaded members 14 and 15 each project inwardly of the hollow structure 13, respectively from the first and second extremities B and C. The free member 14 is rotatable around the longitudinal axis A, and the threaded member 15, which has fine pitch threads, is threadedly engaged with the hollow structure 13 along the same axis.

Each of the free and threaded elements 14 and 15 has a fiber-receiving bore 16 therein along the axis A, through which is mounted the optical fiber 11. The fiber 11, and therefore the grating 12, is under tension and has a first point 20 affixed to the free member 14, and a second point 21 affixed to the threaded member 15. Any appropriate bonding procedure may be used for bonding the fiber to both elements, such as, but not limited to, soldering, brazing, epoxy bonding, glass to metal sealing, or cement bonding. Preferably, an attachment material is provided, such as for example an organic polymer adhesive, an inorganic frit, a ceramic, a glass-ceramic, a metal, etc. The second point 21 is located outside of the hollow structure 13, as shown in FIG. 3. This feature is particularly advantageous since it increases the length 25 available for accommodating the grating 12 while maintaining a short overall package length. In addition, it allows the threaded element to be part of the thermal compensation, as explained below.

The hollow structure 13, the free element 14, and the threaded element 15 are made of materials selected so that their combined thermal expansions result in a negative CTE, characterizing the thermal variation of the distance between the first and second points 20 and 21. As long as it remains under tension, the thermal variations of the length of the grating 12 are also characterized by the same negative CTE. As explained above, this compensates for the thermal variations of the index of refraction of the grating 12 and allows stabilizing its Bragg wavelength against temperature fluctuations. Preferably, the hollow structure 13 is made of a material with a small coefficient of thermal expansion (CTE), while the free element 14 is made of a material with a sizably larger CTE. In a preferred embodiment of the invention, the free element 14 is made of aluminium, the hollow structure 13 is made of fused silica or quartz, and the threaded element is made of brass. These materials are commercially available, inexpensive, and easy to machine.

The section of fiber 11 between points 20 and 21 is typically uncoated, i.e. the polymer coating is stripped to write the grating, and the uncoated portion of the fiber is packaged as shown. This is convenient not only for writing the grating but also for properly bonding-directly to the silica of the fiber 11 and not to the polymer coating. The fiber 11 can also be recoated after writing the grating, but in this case the regions of the fiber 11 that are attached to the package must be locally stripped at the points of attachment 20 and 21.

In the preferred embodiment, the hollow structure 13 includes an elongated tube 13A capped at one end with an unthreaded ring 17, into which the free element 14 can rotate freely to avoid twisting the fiber grating 12 during the fine setting of the Bragg wavelength, as discussed below. The other end of the hollow structure includes a threaded ring 18 into which the threaded element 15 is inserted. The threaded element 15 is preferably secured into position by a locking nut 19. Both the threaded ring 18 and the locking nut 19 are preferably made of a material with a similar CTE as that of the threaded element 15, such as stainless steel in the case of a brass threaded element. The threaded ring 18 is bonded to tube 13 with a suitable adhesive. Although less significantly, these parts do influence the thermal behavior of the athermalization structure. An accurate design of the athermalization structure thus requires the computation of lengths $L_1$, $L_2$, $L_3$ and $L_4$ of all the parts involved, in order to meet the athermalization condition given in Eq. (5).

As explained below, the athermalization structure also allows tuning the Bragg wavelength of the grating by rotating the threaded member 15 within the threaded ring 18, thus modifying the distance between the anchoring points 20 and 21 as well as the tension in the fiber 11. In order to avoid any relative rotation between the free element 14 and the threaded element 15 that would otherwise twist the grating 12 during this operation, means for jointly rotating these two components are provided, such as aligned flat portions 22 machined on the heads of both components. Preferably, flat side-portions 23, or fine-tuning flats, are also machined on the threaded ring 18 and the locking nut 19 to ease the tightening of the latter when securing the threaded member 15 into place once the Bragg wavelength has been properly tuned.

As mentioned, a number of techniques can be employed to fix the fiber 11 to the package at the anchoring points 20 and 21. The attachment material can be an organic polymer adhesive such as epoxy cement, an inorganic frit such as ground glass, a ceramic or a glass-ceramic material, or a metal. Mechanical means for attaching the fiber can also be used.

As it is understood by those skilled in the art, adhesion of the fiber 11 to the athermalization structure is critical. A suitable bonding material as used herein to secure the fiber must have a long-term stability, while preventing slippage or creep of the bond. This requirement stems from the fact that a variation of a mere micron in the length of the grating can typically produce a shift of tens of picometers in the Bragg wavelength. Moreover, the bonding material must have the ability to withstand a high temperature and high humidity environment. When using polymer adhesives, the glass transition point, the curing time and the curing temperature must be determined precisely. If an epoxy-type adhesive is used to fix the optical fiber 11 to the threaded member 15 at point 21, a securing cap 24 can be applied on the head of the screw to avoid any bulk slippage/pistonning in the cylindrical fiber-receiving bore 16 of the attachment region 21.

In order for the athermal system to work, it has been stated above that the package must be assembled such that the grating 12 remains under tension throughout the temperature range of interest (e.g., throughout the range −40° C. to +80° C.). This is accomplished by maintaining the grating under an appropriate tensile stress during attachment of the fiber 11 at points 20 and 21. The required initial degree of tension in a particular application can be readily calculated by those skilled in the art. The corresponding change in strain required to cover a 100° C. temperature range of operation is below 0.1%, well within the proof-test strain for commercial fibers and the allowable long-term strain for installed fiber-optic cables. The maximum strain would only be reached in very cold conditions, and in temperate climates the strain would normally be half this value. Therefore reliability is not a major concern.

This straining of the grating obviously has an effect on its Bragg wavelength. The design of a grating to be used in such an athermal package must thus take into account that it will be put under tension. Moreover, as aforementioned, the preferred embodiment of the present invention provides a mechanism allowing a well-controlled setting of the Bragg wavelength during packaging. This mechanism separates the problem of setting the position of the spectral response of the grating from that of fixing the fiber 11 to the athermalization structure 10. The adjustment proceeds as follows. During assembly of the package, the free element 14 and the threaded element 15 are rendered interdependent by appropriate means, such as a physical link mechanically keeping them in alignment. Once the optical fiber 11 has been fixed to the attachment points 20 and 21, the threaded member 15 and the free member 14 are rotated simultaneously with regards to the hollow structure 13 and the threaded ring 18. Alignment flat portions 22 on the free element 14 and the threaded element 15 are used to ensure their simultaneous rotation. The free element 14 is free to rotate within the unthreaded ring 17, whereas rotation of the threaded element 15 within the threaded ring 18 moves the threaded element 15 longitudinally with regards to the hollow structure 13. This modifies the distance between the anchoring points 20 and 21 and also the length of the grating 12 attached to these points, thus allowing the adjustment of its Bragg wavelength. The avoidance of any relative rotation between the free and threaded elements 14 and 15 prevents twisting of the grating during this operation.

Current telecommunications applications require an accuracy of the order of a few tens of picometers on the Bragg wavelength of FBGs. This requires a submicron-level control of the length of the gratings. Such an accuracy requires the implementation of a fine-tuning mechanism. The number of threads per inch on the ring 18 and the threaded element 15 determines the optical fiber strain per turn of the threaded element 15. With 80 threads per inch, the threaded element 15 produces an axial movement of 317 microns per rotation. Consequently, the threaded element 15 by itself does not necessarily provide a sufficiently accurate control of the Bragg wavelength. A locking nut 19 has been added to the athermalization structure to improve the control of the Bragg wavelength. The sequential rotation of the threaded element 15 with respect to the threaded ring 18 and of the locking nut 19 provides a better control of the axial displacement than would be possible with only the threaded element 15. Both the locking nut 19 and the threaded ring 18-have flat side-portions 23 preferably fitted to two long handle wrenches that are used to further improve the control over their rotation. This system has been shown to allow routinely in production a wavelength tuning resolution better than 15 pm.

The present invention provides a proprietary athermal package capable of passively compensating for the temperature-induced variation of the characteristic spectral response of a fiber Bragg grating. The athermalization structure comprises two—or more—materials with different coefficients of thermal expansion. The design of the athermalization structure takes into account the thermal properties of all the components involved. The package relies on the principle of differential thermal expansion to impose a negative coefficient of thermal expansion to the grating. A cylindrical package that is easily assembled from simple, readily available components and that is no larger than a typical fused tapered coupler housing, yielded a 19-fold reduction in the temperature sensitivity of a Bragg grating over a 100° C. temperature range. Proper operation of the athermal package requires a strain to be imposed on the optical fiber containing the grating that is well within the long-term safe limit for fiber-optic cables. The athermalization structure is also equipped with features that allow a well-controlled adjustment of the absolute Bragg wavelength of the grating contained therein. The athermalization structure is preferably protected from the environment by a hermetically sealed enclosure. The package as a whole is well suited for mass production.

Advantageously, the present invention provides a passive temperature-compensated optical fiber Bragg grating device. More particularly, it provides a small and robust athermal package that tolerates shock and vibration and with characteristics that can be precisely controlled during manufacturing for wavelength fine-tuning. A device designed as explained above is advantageously suitable for commercial production, being relatively simple in construction, inexpensive to manufacture, and yet reliable in operation.

Of course numerous modifications could be made to the embodiment described above without departing from the scope of the invention as defined in the following claims.

What is claimed is:

1. An adjustable athermally packaged optical fiber device, comprising:
   an elongated hollow structure having a longitudinal axis and first and second extremities;
   a free and a threaded member respectively projecting inwardly of said hollow structure from the first and second extremities thereof, the free and threaded members each having a fiber-receiving bore therein extending along the longitudinal axis, the free member being rotatable around said longitudinal axis with respect to the hollow structure, and the threaded member being threadedly engaged with the hollow structure along the longitudinal axis;
   an optical fiber mounted under tension in said hollow structure through the fiber-receiving bores of the free and threaded members, a first point of said fiber being affixed to the free member, a second point thereof being affixed to the threaded member at an end thereof extending outside of the hollow structure, said optical fiber having a refractive index grating extending between said first and second points and having a characteristic spectral response, the hollow structure, free member and threaded member each having a coefficient of thermal expansion selected so that they together compensate for a temperature dependency of said characteristic spectral response of the grating;
   rotating means for jointly rotating said free and threaded members with respect to the hollow structure to adjust a wavelength position of the characteristic spectral response of the grating; and
   a locking nut threadedly engaged with said threaded member at a position completely outside of the hollow member and abutting on the second extremity of said hollow member so as to exert a longitudinal pressure thereon for finely adjusting said wavelength position.

2. An optical fiber device according to claim 1, further comprising an attachment material for fixing the first and second points of the optical fiber to the free and threaded member.

3. An optical fiber device according to claim 2, wherein said attachment material is chosen from the group consisting of an organic polymer adhesive, an inorganic frit, a ceramic, a glass-ceramic and a metal.

4. An optical fiber device according to claim 1, further comprising a securing cap affixed to an outside end of the threaded member around said fiber-receiving bore.

5. An optical fiber device according to claim 1, wherein the rotating means comprise a head of each of said free and threaded members extending outside of the hollow structure, each of said heads being provided with simultaneously engageable aligned flat portions.

6. An optical fiber device according to claim 1, wherein said hollow structure comprises:
   a tube having a coefficient of thermal expansion; and
   an unthreaded ring rigidly fixed to the tube at the first extremity of the hollow structure and having a coefficient of thermal expansion, said coefficients of thermal expansion of the tube, and unthreaded ring defining together the coefficient of thermal expansion of the hollow structure.

7. An optical fiber device according to claim 6, wherein said hollow structure further comprises a threaded ring rigidly fixed to the tube at the second extremity of the hollow structure, said threaded ring engaging the threaded member.

8. An athermal package for an optical fiber device, said device including an optical fiber having a refractive index grating therein, the grating having a characteristic spectral response, the package comprising:
   an elongated hollow structure for mounting the optical fiber in tension therein, said hollow structure having a longitudinal axis and first and second extremities;
   a free and a threaded member respectively projecting inwardly of said hollow structure from the first and second extremities thereof, the free and threaded members each having a fiber-receiving bore therein extending along the longitudinal axis for receiving the optical fiber therethrough, the free member being rotatable around said longitudinal axis with respect to the hollow structure, and the threaded member being threadedly engaged with the hollow structure along the longitudinal axis, a first anchor point being provided in the free member to affix the optical fiber thereto, a second anchor point being provided in the threaded member at an end thereof extending outside of the hollow structure to affix the optical fiber thereto, with the grating extending between said first and second anchor points, the hollow structure, free member and threaded member each having a coefficient of thermal expansion selected so that they together compensate for a temperature dependency of said characteristic spectral response of the grating;
   rotating means for jointly rotating said free and threaded members with respect to the hollow structure to adjust a wavelength position of the characteristic spectral response of the grating; and
   a locking nut threadedly engaged with said threaded member at a position completely outside of the hollow member and abutting on the second extremity of said hollow member so as to exert a longitudinal pressure thereon for finely adjusting said wavelength position.

9. A fine-tunable athermally packaged optical fiber device, comprising:
   an elongated hollow structure having a longitudinal axis and first and second extremities;
   a free and a threaded member respectively projecting inwardly of said hollow structure from the first and second extremities thereof; the free and threaded members each having a fiber-receiving bore therein extending along the longitudinal axis, the free member being rotatable around said longitudinal axis with respect to the hollow structure, and the threaded member being threadedly engaged with the hollow structure along the longitudinal axis;

an optical fiber mounted under tension in said hollow structure through the fiber-receiving bores of the free and threaded members, a first point of said fiber being affixed to the free member, a second point thereof being affixed to the threaded member, said optical fiber having a refractive index grating extending between said first and second points and having a characteristic spectral response, the hollow structure, free member and threaded member each having a coefficient of thermal expansion selected so that they together compensate for a temperature dependency of said characteristic spectral response;

rotating means for jointly rotating said free and threaded members with respect to the hollow structure to adjust a wavelength position of the characteristic spectral response of the grating; and a locking nut threadedly engaged with said threaded member at a position completely outside of the hollow member and abutting on the second extremity of said hollow member so as to exert a longitudinal pressure thereon for finely adjusting said wavelength position.

10. A fine-tunable optical fiber device according to claim 9, wherein the rotating means comprise a head of each of said free and threaded members extending outside of the hollow structure, each of said heads being provided with simultaneously engageable aligned flat portions.

11. A fine-tunable optical fiber device according to claim 9, wherein the hollow structure comprises:
   a tube; and
   a threaded ring rigidly fixed to the tube at the second extremity of the hollow structure and engaging the threaded member.

12. An optical fiber device according to claim 11, wherein said hollow structure further comprises an unthreaded ring rigidly fixed to the tube at the first extremity of the hollow structure and having a coefficient of thermal expansion, said coefficients of thermal expansion of the tube, and unthreaded ring defining together the coefficient of thermal expansion of the hollow structure.

13. A fine-tunable optical fiber device according to claim 9, wherein each of said threaded ring and nut have flat side-portions.

14. An athermal package for a fine-tunable optical fiber device, said device including an optical fiber having a refractive index grating therein, the grating having a characteristic spectral response, the package comprising:

an elongated hollow structure for mounting the optical fiber in tension therein, said hollow structure having a longitudinal axis and first and second extremities;

a free and a threaded member respectively projecting inwardly of said hollow structure from the first and second extremities thereof, the free and threaded members each having a fiber-receiving bore therein extending along the longitudinal axis for receiving the optical fiber therethrough, the free member being rotatable around said longitudinal axis with respect to the hollow structure, and the threaded member being threadedly engaged with the hollow structure along the longitudinal axis, first and second anchor points being respectively provided in the free and threaded members to affix the optical fiber thereto with the grating extending between said first and second anchor points, the hollow structure, free member and threaded member each having a coefficient of thermal expansion selected so that they together compensate for a temperature dependency of said characteristic spectral response;

rotating means for jointly rotating said free and threaded members with respect to the hollow structure to adjust a wavelength position of the characteristic spectral response of the grating; and a locking nut threadedly engaged with said threaded member at a position completely outside of the hollow member and abutting on the second extremity of said hollow member so as to exert a longitudinal pressure thereon for finely adjusting said wavelength position.

* * * * *